US011387676B2

(12) United States Patent
Ng et al.

(10) Patent No.: US 11,387,676 B2
(45) Date of Patent: Jul. 12, 2022

(54) DUAL-MODE HIGH-EFFICIENCY VOLTAGE REGULATOR FOR WIRELESS CHARGING MODULES

(71) Applicant: STMicroelectronics Asia Pacific Pte Ltd, Singapore (SG)

(72) Inventors: Eng Jye Ng, Singapore (SG); Chee Weng Cheong, Singapore (SG); Huiqiao He, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 151 days.

(21) Appl. No.: 17/007,225

(22) Filed: Aug. 31, 2020

(65) Prior Publication Data

US 2021/0091598 A1 Mar. 25, 2021

Related U.S. Application Data

(60) Provisional application No. 62/903,998, filed on Sep. 23, 2019.

(51) Int. Cl.
| | |
|---|---|
| *H02J 50/10* | (2016.01) |
| *H02M 1/36* | (2007.01) |
| *H02M 1/00* | (2006.01) |
| *H02J 7/02* | (2016.01) |
| *H02M 1/08* | (2006.01) |

(52) U.S. Cl.
CPC .............. *H02J 50/10* (2016.02); *H02J 7/02* (2013.01); *H02M 1/08* (2013.01); *H02M 1/36* (2013.01); *H02J 2207/20* (2020.01); *H02M 1/0045* (2021.05)

(58) Field of Classification Search
CPC .... H02J 50/10; H02J 2207/20; H02M 1/0045; H02M 1/36
USPC ......................................................... 320/108
See application file for complete search history.

(56) References Cited

U.S. PATENT DOCUMENTS

| | | | | |
|---|---|---|---|---|
| 9,904,306 | B2 * | 2/2018 | Yeon ....................... | H02J 50/70 |
| 10,038,339 | B2 * | 7/2018 | Sankar ................... | H02J 50/80 |
| 10,523,036 | B2 * | 12/2019 | Pan ........................ | H02J 7/0013 |
| 11,171,501 | B2 * | 11/2021 | Fan ........................ | H02J 7/0072 |
| 2016/0268834 | A1 * | 9/2016 | Satyamoorthy ......... | H02J 50/10 |
| 2021/0091598 | A1 * | 3/2021 | Ng .......................... | H02M 1/36 |

* cited by examiner

*Primary Examiner* — Richard V Muralidar
(74) *Attorney, Agent, or Firm* — Crowe & Dunlevy

(57) ABSTRACT

A system comprising includes a wireless power receiver generating a rectified voltage. A low dropout regulator (LDO) generates a first regulated output voltage from the rectified voltage, during a first phase. A first switch couples the first regulated output voltage to a voltage output node during the first phase. During a second phase, the LDO generates a second regulated output voltage from the rectified voltage. A switching regulator generates a third regulated output voltage during the second phase. A second switch couples the third regulated output voltage to the voltage output node during the second phase. During a third phase, the LDO is disabled, while the switching regulator continues to generate the third regulated output voltage. The first switch opens during the third phase while the second switch remains closed.

29 Claims, 5 Drawing Sheets

DUAL-MODE HIGH-EFFICIENCY VOLTAGE REGULATOR FOR WIRELESS CHARGING MODULES

RELATED APPLICATION

This application claims priority to United States Provisional Application for Patent No. 62/903,998, filed Sep. 23, 2019, the contents of which are incorporated by reference to the maximum extent allowable under the law.

TECHNICAL FIELD

This application is directed to the field of wireless power transmission and, in particular, to a wireless charging module including high efficiency voltage regulator circuit, for use in a mobile device.

BACKGROUND

Portable electronic devices, such as smartphones, smartwatches, audio output devices (earbuds, headphones), and wearables operate on battery power, and not from wired power transmitted thereto over wired transmission lines and distribution systems. The batteries used for such devices are typically rechargeable and, therefore, a way to recharge the power of such batteries is necessary.

Most portable electronic devices include a charging port, typically conforming to the Micro USB or USB-C standards, into which a power cord connected to a power source can be inserted to provide for recharging of their batteries. However, such charging ports may make it difficult to enhance the water resistance of the electronic device, and are subject to damage from repeated use. In addition, some smaller portable electronic devices (for example, earbuds and smartwatches) may lack the available space to provide for a charging port. Still further, some users may find it cumbersome to plug a power cord into the charging port of an electronic device to charge the battery of that device.

Therefore, to address these issues, wireless power transmission has been developed. As shown in FIG. 1, a typical prior art wireless power transmission system 10 utilizes a transmitter 11 including a transmission coil Lp and a serial capacitance Cp forming a serial resonant LC network, driven by electric power from a power source 12 (typically a wired connection, but in some cases a battery), that generates a time-varying electric field, and a receiver 15 including a receiver coil Ls and a serial capacitance Cs forming a similar serial resonant LC network in which the time-varying electric field induces an AC current.

The receiver 15 includes a bridge rectifier 16 (comprised of the illustrated diodes D1-D4) that rectifies the AC current to produce a DC current that charges a tank capacitor Ctank, connected to an input node Nin of a regulator 17, to a regulator input voltage. The regulator 17, typically a low dropout amplifier, produces a regulated output voltage at its output node Nout, which is provided to a load (represented by the load resistance R1 and the load capacitance Cl).

The rectified voltage produced at the input node Nin of the regulator 17 may be on the order of, for example, 25V, and the output of the regulator 17 at the output node Nout may be on the order of, for example, 5V. As explained, the regulator 17 is commonly a low dropout amplifier. While having useful regulating ability, a low dropout amplifier dissipates the excess power input thereto as heat. This power dissipation, particularly when the rectified voltage at the input node Nin is multiple times the voltage at the output node Nout, leads to inefficient power transfer, which is undesirable, as power is lost, and heat is generated. Given that such wireless power receivers 15 are typically incorporated within compact portable electronic devices, both this inefficient power transfer as well as excess heat are undesirable.

Therefore, further development is needed.

SUMMARY

A system disclosed herein includes: a wireless power receiver configured to wirelessly receive power and generate therefrom a rectified voltage; a low dropout regulator that, during a first phase, generates a first regulated output voltage from the rectified voltage; and a first switch that couples the first regulated output voltage to a voltage output node during the first phase. The low dropout regulator, during a second phase, generates a second regulated output voltage from the rectified voltage, with the second regulated output voltage being lesser in magnitude than the first regulated output voltage. The system also includes: a switching regulator that generates a third regulated output voltage during the second phase, the third regulated output voltage being greater than the second regulated output voltage; and a second switch that couples the third regulated output voltage to the voltage output node during the second phase. The low dropout regulator, during a third phase, is disabled, while the switching regulator continues to generate the third regulated output voltage during the third phase. The first switch opens during the third phase while the second switch remains closed during the third phase.

Internal circuitry is powered between the voltage output node and ground. Disabling the low dropout regulator and continuing to power the voltage output node using the switching regulator during the third phase eliminates power dissipation by the low dropout regulator that would otherwise occur during the third phase if the low dropout regulator had not been disabled and therefore also eliminates rise in temperature that would otherwise occur during the third phase if the low dropout regulator had not been disabled.

The low dropout regulator may include: a p-channel power transistor having a source coupled to the rectified voltage, a drain coupled to an output node, and a gate receiving a drive signal; a feedback resistance coupled between the output node and ground and producing a feedback voltage; feedback resistance control circuitry configured to lower the feedback resistance during the second phase; and drive circuitry configured to generate the drive signal for the p-channel power transistor based upon the feedback voltage.

The feedback resistance may include a first resistance coupled between the output node and a feedback node, a second resistance coupled between the feedback node and a first node, and a third resistance coupled between the first node and ground.

The feedback resistance control circuitry may be configured to short the third resistance during the second phase to thereby lower the feedback resistance.

The feedback resistance control circuitry may include an n-channel transistor having a drain coupled to the first node, a source coupled to ground, and a gate coupled to an external regulator enable signal.

The drive circuitry may be disabled during the third phase to thereby disable the low dropout regulator in response to assertion of a low dropout disable signal.

The drive circuitry may include: a Brokaw cell producing a first voltage as a function of the feedback voltage; a compensation network producing a compensated voltage from the first voltage; and a driver stage producing the drive signal from the compensated voltage. The Brokaw cell, compensation network, and driver stage are disabled in response to assertion of the low dropout disable signal.

A power source may receive the rectified voltage and generate therefrom a power signal, and a load powered by the power signal.

The load may be a battery charging circuit for charging a battery.

Also disclosed herein is a method aspect. This method includes: receiving power wirelessly; and rectifying the received power to produce a rectified voltage. In a startup condition, the method includes: enabling a low dropout regulator circuit, the low dropout regulator circuit generating an output voltage from the rectified voltage; and powering internal analog and digital circuitry using the output voltage by coupling the output voltage to the internal analog and digital circuitry. When startup is complete, the method includes: reducing the output voltage generated by the low dropout regulator circuit; enabling a switching regulator; coupling an output voltage of the enabled the switching regulator to the internal analog and digital circuitry; and then disabling the low dropout regulator circuit. The output voltage generated by the low dropout regulator circuit may be reduced by reducing resistance of a feedback circuit in the low dropout regulator circuit.

The resistance of the feedback circuit may be reduced by shorting one of a plurality of series connected resistances in the feedback circuit.

The method may also include generating a power output signal from the rectified voltage, and powering a load using the power output signal.

Also disclosed herein is an electronic device, including: internal analog and digital circuitry; a battery; a battery charging circuit; a receiver coil receiving wirelessly transmitted power and generating an AC input voltage therefrom; a rectifier rectifying the AC input voltage to produce a rectified voltage; a low dropout regulator that, during a first phase, generates a first regulated output voltage from the rectified voltage; and a first switch that couples the first regulated output voltage to a voltage output node during the first phase to power the internal analog and digital circuitry. The low dropout regulator, during a second phase, generates a second regulated output voltage from the rectified voltage, with the second regulated output voltage being lesser in magnitude than the first regulated output voltage. The first switch couples the second regulated output voltage to the voltage output node during the second phase. A switching regulator generates a third regulated output voltage during the second phase, the third regulated output voltage being greater than the second regulated output voltage. A second switch couples the third regulated output voltage to the voltage output node during the second phase. The low dropout regulator, during a third phase, is disabled, while the switching regulator continues to generate the third regulated output voltage during the third phase. The first switch opens during the third phase while the second switch remains closed during the third phase. A power supply circuit receives the rectified voltage and generates therefrom a power supply signal for powering the battery charging circuit, during the first, second, and third phases.

The low dropout regulator may include: a p-channel power transistor having a source coupled to the rectified voltage, a drain coupled to an output node, and a gate receiving a drive signal; a feedback resistance coupled between the output node and ground and producing a feedback voltage; feedback resistance control circuitry configured to lower the feedback resistance during the second phase; and drive circuitry configured to generate the drive signal for the p-channel power transistor based upon the feedback voltage.

The feedback resistance may include a first resistance coupled between the output node and a feedback node, a second resistance coupled between the feedback node and a first node, and a third resistance coupled between the first node and ground.

The feedback resistance control circuitry may be configured to short the third resistance during the second phase to thereby lower the feedback resistance.

The feedback resistance control circuitry may include an n-channel transistor having a drain coupled to the first node, a source coupled to ground, and a gate coupled to an external regulator enable signal.

Also disclosed herein is a wireless charging module including: a wireless power receiver configured to wirelessly receive power and generate therefrom a rectified voltage; a low dropout regulator that, in response to lack of assertion of a low dropout amplifier disable signal, generates a first regulated output voltage from the rectified voltage; and a first switch that couples the first regulated output voltage to a voltage output node to thereby power at least one internal circuit, in response to lack of assertion of the low dropout amplifier disable signal. The voltage output node, in response to an external voltage enable signal being asserted, receives an external voltage, and the low dropout regulator generates a second regulated output voltage from the rectified voltage so as to transition the at least one internal circuit to being powered by the external voltage, with the second regulated output voltage being lesser in magnitude than the first regulated output voltage. The low dropout amplifier, in response to assertion of the low dropout amplifier disable signal, is disabled. The first switch opens in response to assertion of the low dropout amplifier disable signal.

The low dropout amplifier disable signal may be generated as being deasserted by a host external to the wireless charging module at startup. An external voltage enable signal may be generated as being asserted by the host in response to the external voltage reaching a first external voltage level. The low dropout amplifier disable signal may be generated as being asserted by the host in response to the external voltage reaching a second external voltage level greater than the first external voltage level.

The low dropout amplifier disable signal may be generated as being deasserted by a digital core internal to the wireless charging module at startup. The external voltage enable signal may be generated as being asserted by a host external to the wireless charging module in response to the external voltage reaching a first external voltage level. The low dropout amplifier disable signal may be generated as being asserted by the digital core in response to the external voltage reaching a second external voltage level greater than the first external voltage level.

The wireless charging module may include: a monitoring circuit that generates the low dropout amplifier disable signal is generated as being deasserted at startup. An external voltage enable signal may be generated as being asserted by a host external to the wireless charging module in response to the external voltage reaching a first external voltage. The monitoring circuit may generate the low dropout amplifier disable signal as being asserted in response to the external voltage reaching a second external voltage greater than the first external voltage.

The monitoring circuit may include: a comparator configured to assert its output in response to the external voltage being equal to or greater than a reference voltage; and a logical AND gate configured to assert the low dropout amplifier disable signal in response to the output of the comparator being asserted and in response to the external voltage enable signal being asserted, and to otherwise deassert the low dropout amplifier disable signal.

The wireless charging module may include: a monitoring circuit that generates the low dropout amplifier disable signal as being deasserted at startup; and a digital core that generates the external voltage enable signal as being deasserted at startup. The digital core may assert the external voltage enable signal in response to the external voltage reaching a first external voltage level. The digital core may assert a comparison signal in response to the external voltage reaching a second external voltage level greater than the first external voltage level. The monitoring circuit may assert the low dropout amplifier disable signal in response to the external voltage enable signal and the comparison signal being asserted.

The monitoring circuit may include an AND gate that asserts the low dropout amplifier disable signal in response to the external voltage enable signal and the comparison signal being asserted, and otherwise deasserts the low dropout amplifier disable signal.

The low dropout amplifier disable signal may be generated as being deasserted by a host external to the wireless charging module at startup. A digital core may generate the external voltage enable signal as being deasserted at startup. The digital core may assert the external voltage enable signal in response to the external voltage reaching a first external voltage level. The low dropout amplifier disable signal may be asserted by the host external in response to the external voltage reaching a second external voltage level greater than the first external voltage level.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
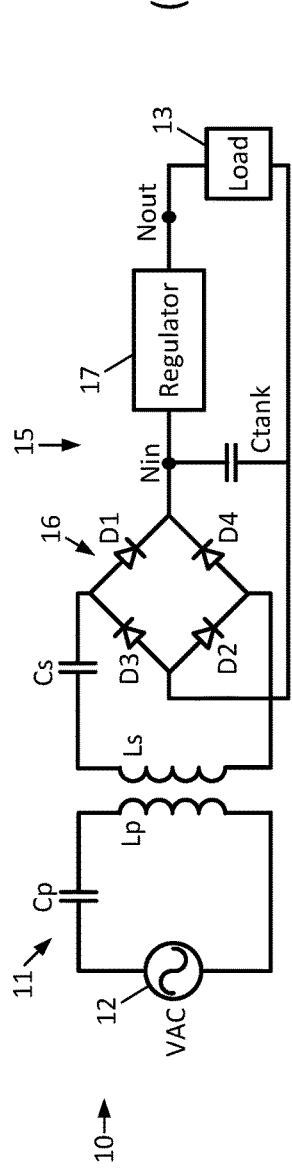
FIG. 1 is a block diagram of a prior art wireless charging system.
Figure 2:
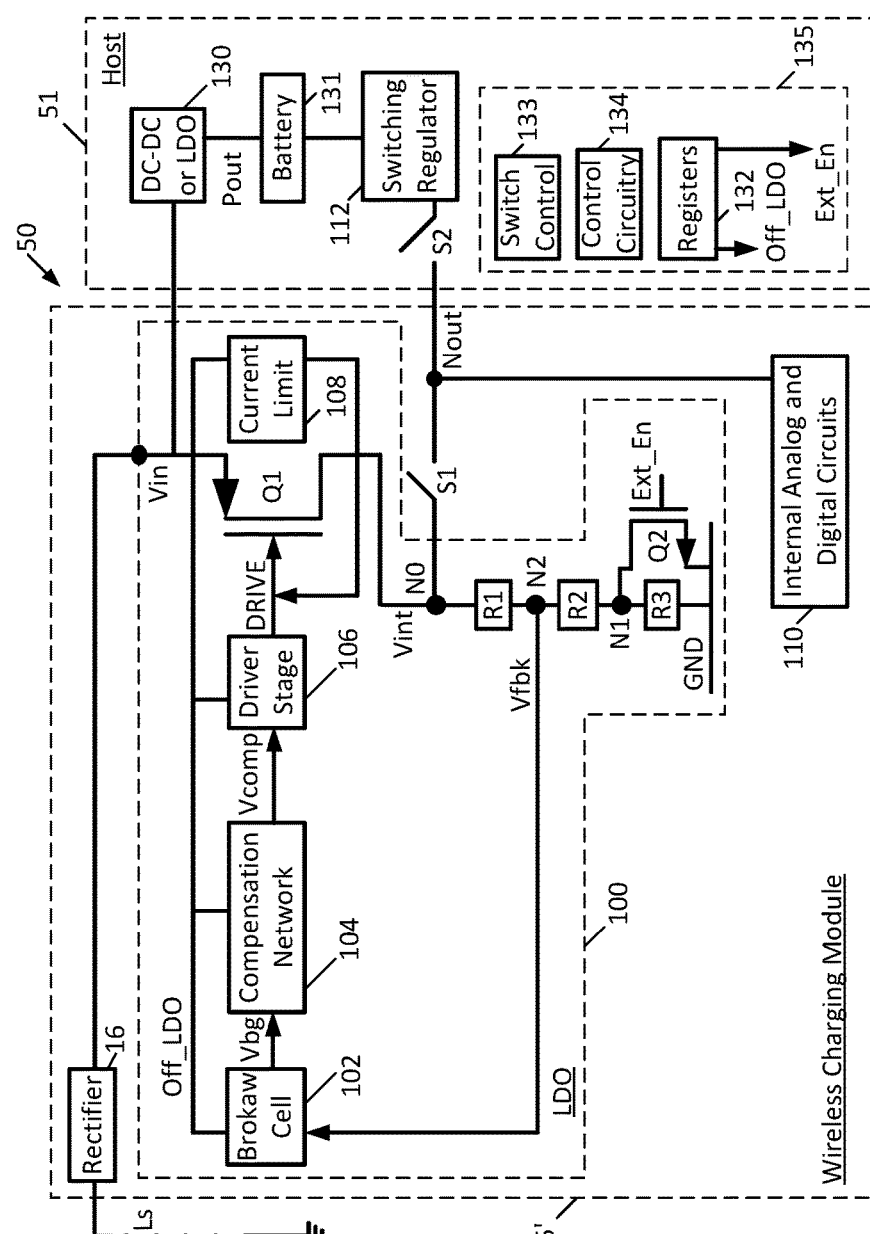
FIG. 2 is a schematic block diagram of a wireless charging module and host, in accordance with this disclosure.

Now described with reference to FIG. 2 is an electronic device 50 including a host device 51 and a wireless charging module 15'.

The electronic device 50 may be a mobile device, such as a smartphone, tablet, smartwatch, or a wireless earbud system, for example, and includes a coil Ls that, due to a time varying electric field created by the primary coil of a wireless power transmitter, produces an AC signal.

The wireless charging module 15' includes a rectifier 16 that rectifies the AC signal to produce a rectified voltage Vin that is received by a high efficiency low dropout (LDO) regulator 100.

The LDO 100 includes a p-channel power transistor Q1 having its source coupled to receive the rectified voltage Vin, its drain coupled to node N0, and its gate coupled to be driven by a drive signal DRIVE from a driver stage 106. Resistances R1-R3 are coupled in series between output node N0 and ground. Node N1 is the tap between resistances R2 and R3, and node N2 is the tap between resistances R1 and R2. A feedback voltage Vfbk is produced at node N2. An n-channel transistor Q2 has its drain coupled to node N1, its source coupled to ground, and its gate coupled to receive an external power enable signal Ext_En.

The LDO 100 also includes a Brokaw cell 102 that produces a bandgap voltage Vbg in response to the feedback voltage Vfbk, which is compensated by compensation network 104 to produce compensated voltage Vcomp, which is used by the driver stage 106 to produce the drive signal DRIVE for driving the power transistor Q1. A current limiting circuit 108 is also coupled to the driver stage 106 to receive the drive signal DRIVE. The Brokaw cell 102, compensation network 104, driver stage 106, and current limit circuit 108 are selectively enabled by the LDO off signal Off_LDO, and can collectively be referred to as "drive circuitry".

Node N0 is selectively coupled to an output node Nout within the wireless charging module 15' by a switch S1 (e.g., a transmission gate). The wireless charging module 15' also includes internal analog/digital circuits 100 that receive electrical power from the output node Nout.

The host device 51 includes a DC-DC converter or LDO 130 that receives the rectified voltage Vin and generates therefrom output power Pout delivered to a battery 131. The battery 131 powers a switching regulator 112 that has its output selectively coupled to the output node Nout by a switch S2 (e.g., a transmission gate).

The host device 51 includes a controller 135 with a switch control circuit 133 that controls switches S1 and S2 in the fashion that will be described below, registers 132 that output the Off_LDO and Ext_En signals as will be described below, and control circuitry 134 that executes firmware that detects operating conditions and modifies the contents of the registers (and therefore the values of Off_LDO and Ext_En) based thereupon, as will be described in detail below.

From the above, should be noted that the switching regulator 112 is external to the LDO 100, and is external to the wireless charging module 15' involved with wireless power receipt, but is internal to the electronic device 50.

Operation is now described. As explained above, wireless charging module 15' receives an AC voltage transmitted to the secondary coil Ls, and rectifies the AC voltage to produce the voltage Vin. During a startup period (time period TP1 shown in FIG. 3), the signals Ext_En and Off_LDO (which may be produced from or stored in registers 132) are set to a deasserted state (logic low), and the LDO 100 is enabled while switch S1 is closed so that the LDO produces the output voltage Vint for usage by the internal analog/digital circuits 110 so that those circuits can start up properly.

Once the voltage Vint produced by the LDO 100 is acceptable (for example, of sufficient magnitude to power the internal analog and digital circuits 100), a transition mode (time period TP2 shown in FIG. 3) begins wherein the signals Ext_En and Off_LDO can be operated so as to switch supply of power of the internal analog and digital circuits 110 to come from the switching regulator 112.

Figure 3:
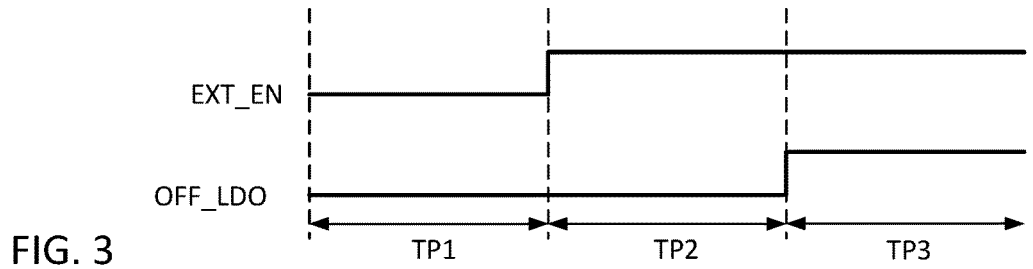
FIG. 3 is a timing diagram of the LDO off signal and the external power enable signal during startup mode in which the internal analog/digital circuits in the wireless charging module are powered by the received wireless power, transition mode in which the wireless charging module gets ready for the internal analog/digital circuits to be powered by an external switching regulator within the host, and in external power mode during which the internal analog/digital circuits are powered by the external switching regulator exclusively.

If the switching regulator 112 has started up properly by the end of time period TP1, the signal Ext_En will then be asserted (rise to a logic high) during time period TP2 shown in FIG. 3. The result of the signal Ext_En being asserted is that the n-channel transistor Q2 turns on, shorting resistor R3, and therefore lowering the feedback resistance (previously the resistances R2+R3) to the resistance of R2, which causes the Brokaw Cell 102 to lower the bandgap voltage Vbg, thereby reconfiguring the LDO to lower the voltage at output node N0 from a higher voltage (e.g., 5V) to a lower voltage (e.g., 4.2V).

At this point, switch S2 is closed. Since the LDO 100 cannot sink current due to its use of a p-channel transistor as its power transistor, current will not flow between the LDO 100 and switching regulator 112 despite the voltage at output node N0 being lower than the voltage at the output of the switching regulator 112. This voltage at the output of the switching regulator 112 can be referred to as the external voltage Vext.

Next, during time period TP3 as shown in FIG. 3, the signal Off_LDO will be asserted (rise to logic high), turning off the Brokaw cell 102, compensation network 104, driver stage 106, and current limit circuit 108 to thereby disable the LDO 100. Switch S1 is opened as well. Thus, at this point, the internal analog/digital circuits 110 are powered by the external voltage Vext from the switching regulator 112.

Therefore, in summary, the device 50 utilizes the LDO 100 to power the internal analog and digital circuits 110 during startup operations to permit startup using the rectified voltage Vin, but to avoid the power dissipation disadvantages inherent to the LDO 100, once startup is complete, the switching regulator 112 (powered by a battery charging circuit 131 of the electronic device 50) is instead used. Note, however, that switchover from the LDO 100 to the switching regulator 112 need not necessarily occur at the end of startup, and continued use of the LDO output may be made as long as is desirable given current operating conditions of the device 50.

Figure 4:
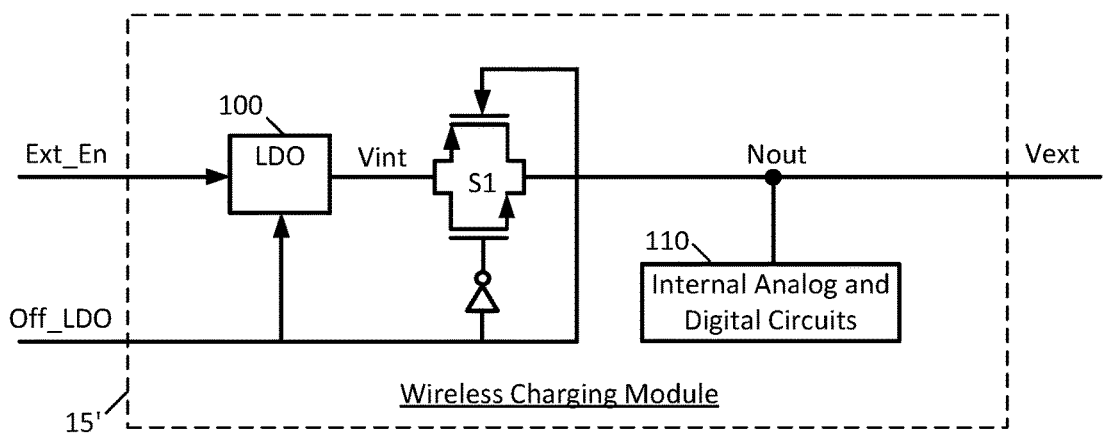
FIG. 4 is a simplified block diagram of the wireless charging module of FIG. 2.

Notice that in the device 50 of FIG. 2, both the Off_LDO signal and the Ext_En signal are received from the host 51, which is external to the wireless charging module 15'. This can be seen in the simplified block diagram of the wireless charging module 15' shown in FIG. 4. As seen, the wireless charging module 15' includes the LDO 100 described above, which receives the Off_LDO and Ext_En signals as input, and produces the internal voltage Vint as described above. Note here that the switch S1 is shown as an transmission gate, comprised of: an n-channel transistor having its drain coupled to the LDO 100 to receive the internal voltage Vint, its source coupled to the output node Nout, and its gate operated by an inverse of the Off_LDO signal; and a p-channel transistor having its source coupled to the LDO 100 to receive the internal voltage Vint, its drain coupled to the output node Nout, and its gate operated by the Off_LDO signal. Note that the transmission gate S1 being operated by the Off_LDO signal is consistent with the description above, as switch S1 is described as being closed when Off_LDO is low (which would have the effect of turning on the transmission gate) and open when Off_LDO is high (which would have the effect of turning off the transmission gate).

Figure 5:
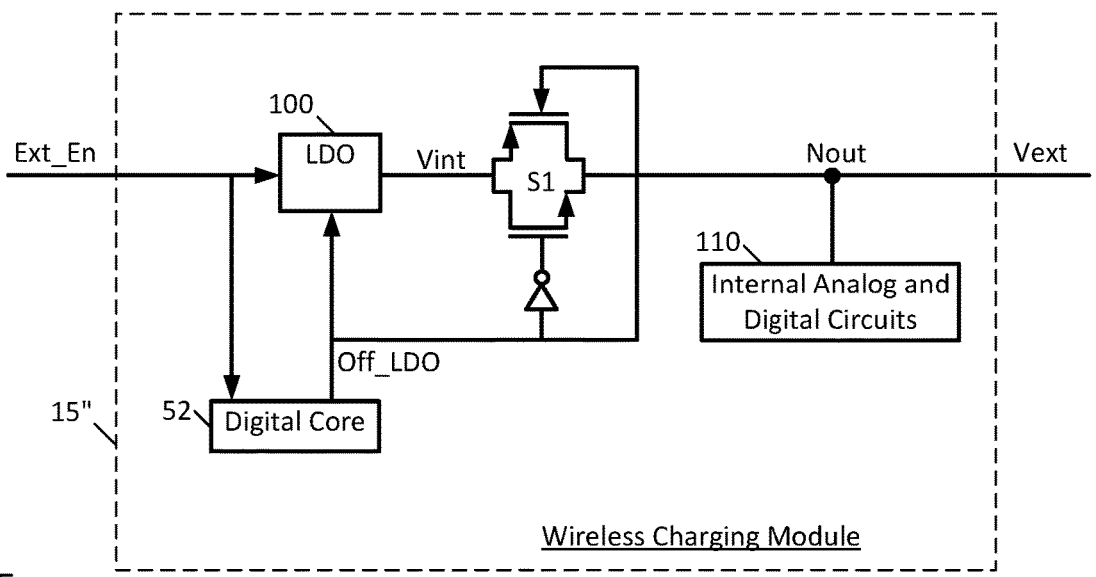
FIG. 5 is a simplified block diagram of a variant of the wireless charging module of FIG. 2.

An alternative is shown in FIG. 5, where a digital core 52 within the wireless charging module 15" receives the Ext_En signal, and generates the Off_LDO signal. Otherwise, this wireless charging module 15" is as described above and operates as described above.

Figure 6:
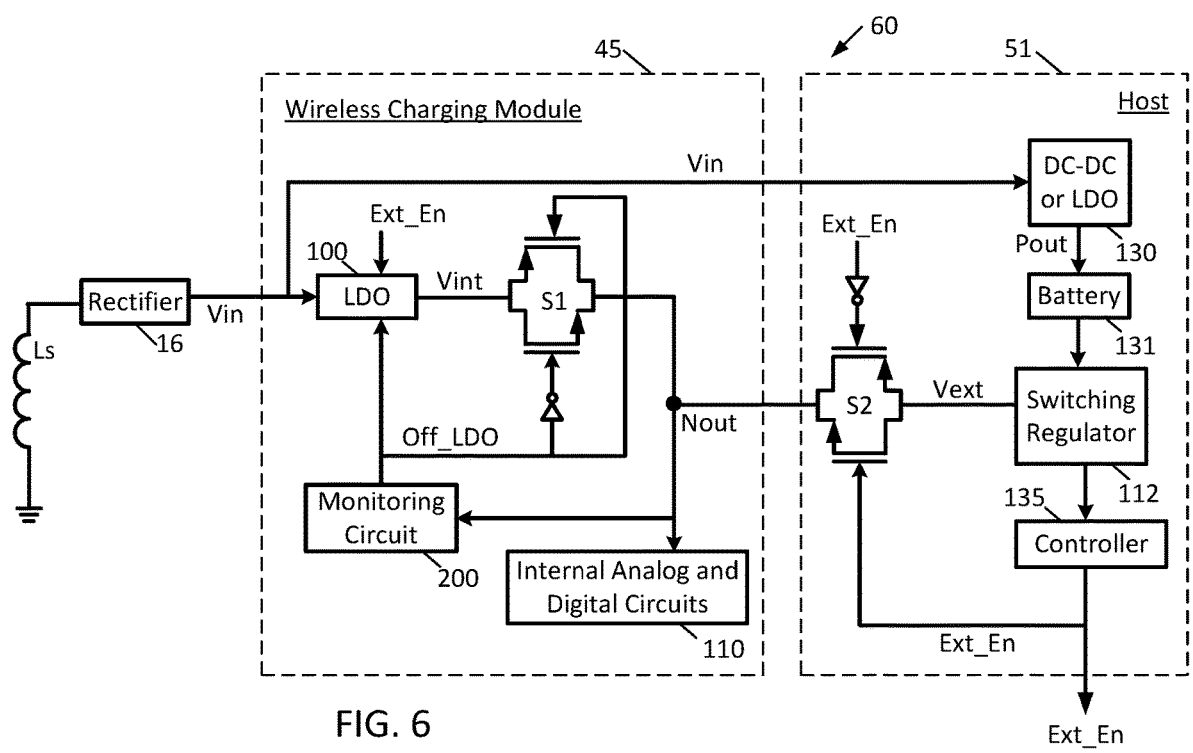
FIG. 6 is a block diagram of another embodiment of a wireless charging module and host, in accordance with this disclosure.

Now described with reference to FIG. 6 is another electronic device 60 including a host device 51 and a wireless charging module 45. The electronic device 60 may be a mobile device, such as a smartphone, tablet, smartwatch, or a wireless earbud system, for example, and includes a coil Ls that, due to a time varying electric field created by the primary coil of a wireless power transmitter, produces an AC signal.

The wireless charging module 45 includes a rectifier 16 that rectifies the AC signal to produce a rectified voltage Vin that is received by a high efficiency low dropout (LDO) regulator 100. The details of the structure and operation of this LDO 100 have been given above in the other embodiments, so they need not be given again for brevity.

The LDO 100 receives the rectified voltage Vin as input, and receives the LDO off signal Off_LDO and the external power enable signal Ext_En as control outputs. The LDO 100, as described, generates an internal voltage Vint.

A transmission gate S1 selectively couples the internal voltage Vint to an output node Nout. The transmission gate S1 is comprised of: an n-channel transistor having its drain coupled to the LDO 100 to receive the internal voltage Vint, its source coupled to the output node Nout, and its gate operated by an inverse of the Off_LDO signal; and a p-channel transistor having its source coupled to the LDO 100 to receive the internal voltage Vint, its drain coupled to the output node Nout, and its gate operated by the Off_LDO signal.

Internal analog/digital circuits 110 are coupled to the output node Nout to receive electrical power therefrom. A monitoring circuit 200 is likewise coupled to the output node Nout.

The host device 51 includes a DC-DC converter or LDO 130 that receives the rectified voltage Vin and generates therefrom output power Pout delivered to a battery 131. The battery 131 powers a switching regulator 112 that generates an external voltage Vext at its output, and its output is selectively coupled to the output node Nout by a transmission gate S2. The switching regulator 112 also powers a controller 135 that executes firmware that detects operating conditions and modifies the contents of internal registers (and therefore the value of Ext_En) based thereupon, as will be described in detail below. The particular internals of the controller 135 are not shown for brevity, and instead its functionality will be described below.

The transmission gate S2 is comprised of: an n-channel transistor having its drain coupled to the switching regulator 112 to receive the external voltage Vext, its source coupled to the output node Nout of the wireless charging module 45, and its gate biased by the external voltage enable signal Ext_En; and a p-channel transistor having its source coupled to the switching regulator 112 to receive the external voltage Vext, its drain coupled to the output node Nout of the wireless charging module 45, and its gate biased by an inverse of the external voltage enable signal Ext_En.

From the above, should be noted that the switching regulator 112 is external to the LDO 100, and is external to the wireless charging module 45 involved with wireless power receipt, but is internal to the electronic device 50.

Figure 7:
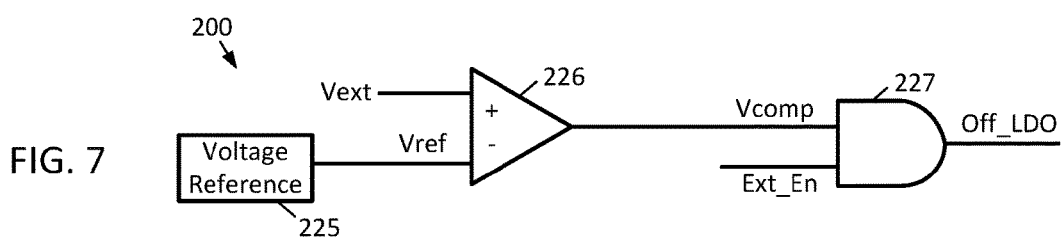
FIG. 7 is a block diagram of the monitoring circuit of the wireless charging module of FIG. 6.

The structure of the monitoring circuit 200 is shown in FIG. 7. Here, it can be seen that the monitoring circuit 200 includes a comparator 226 receiving the external voltage Vext and a reference voltage Vref (from a voltage reference generator 225) as input, and generating a comparison signal Vcomp as output. An AND gate 227 receives the comparison signal Vcomp as well as the external voltage enable signal Ext_En, performs a logical-AND operation on Vcomp and Ext_En, and generates the LDO shutoff control signal Off_LDO as the result.

Operation of the electronic device 60 is now described. In operation, the secondary Ls has a time-varying current induced therein by an adjacent primary coil of a transmitter generating a time-varying electric field. The time varying current is rectified by the rectifier 16 produced the rectified voltage Vin, beginning startup. The LDO 100 generates the internal voltage Vint from the rectified voltage Vin, at higher voltage, of about 5V, as explained above.

At startup, the switching regulator 112 has not yet generated the external voltage Vext at a sufficient level for powering the internal analog and digital circuits 110. As a result, the controller 135 maintains the external voltage enable signal Ex_En at a logic low. Since the external voltage Vext will at this point be lower than the reference voltage Vref (which is set to a desired value for Vext), the comparator 226 does not assert its output. Resultingly, the AND gate 227 maintains the LDO off signal Off_LDO at a logic low.

Off_LDO being a logic low has the effect of turning on the transmission gate S1, thereby connecting the internal voltage Vint to node Nout, and the internal analog/digital circuits 110 are then powered by the internal voltage Vint.

One the external voltage Vext is generated at a sufficiently high level by the switching regular 112 to be capable of beginning to power the internal analog and digital circuits 110, the controller 135 asserts the external voltage enable signal Ext_En. As explained earlier, this has the effect of causing the LDO 100 to lower the internal voltage Vint generated, for example from 5V to 4.2V. The external voltage enable signal Ext_En also has the effect of turning on the transmission gate S2, thereby connecting the external voltage Vext to the output node Nout. As explained earlier, since the LDO 100 cannot sink current due to its use of a p-channel transistor as its power transistor, current will not flow between the switching regulator 112 and the LDO 100.

Once the external voltage Vext continues to rise, reaching the reference voltage Vref of for example 4.8V, the comparator 226 asserts Vcomp, which, together with the asserted external voltage enable signal Ext_En, results in the AND gate 227 asserting the Off_LDO signal, turning off the LDO 100, and closing transmission gate S1. Therefore, at this point, the internal analog/digital circuits 100 are solely powered by the switching regulator 112, not the LDO 100.

Figure 8:
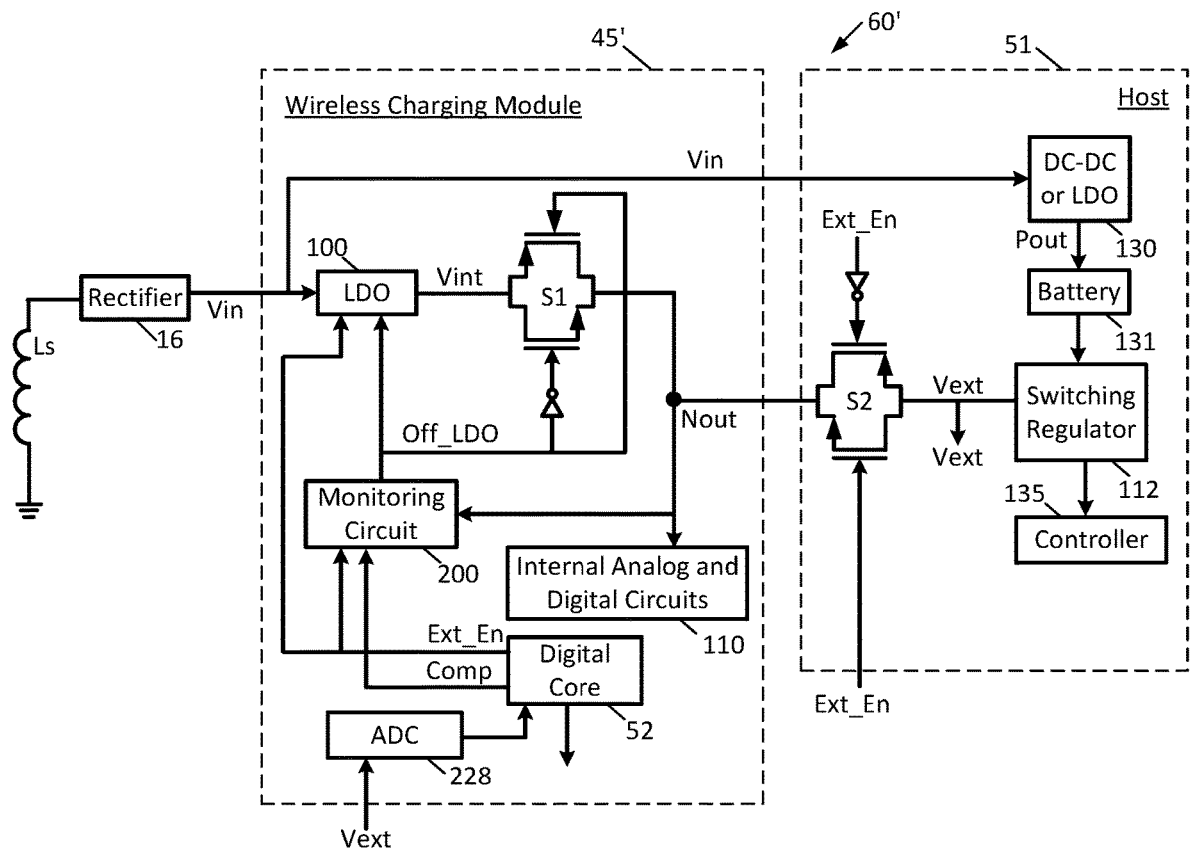
FIG. 8 is a block diagram of a variant of the wireless charging module of FIG. 6, in accordance with this disclosure.

A variant of the electronic device 60' described above is now described with reference to FIG. 8. Notice that here, an analog to digital converter (ADC) 228 within the wireless charging module 45' receives and digitizes the external voltage Vext, and from the value of Vext, and a digital core 52 (also within the wireless charging module 45') generates the external voltage enable signal Ext_En, which is used within the wireless charging module 45' as well as within the host 51. In addition, the digital core 52 compares the digital value of Vext to a digital reference voltage, and asserts a comparison signal Comp if Vext is greater than or equal to the digital reference value.

Figure 9:
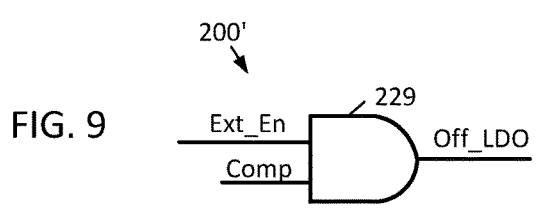
FIG. 9 is a block diagram of the monitoring circuit of the wireless charging module of FIG. 8.

Also notice that here, the monitoring circuit 200' has the structure as shown in FIG. 9, namely, including an AND gate 229 that receives the external voltage enable signal Ex_En and the comparison signal Comp, performs a logical-AND operation thereon, and generates the LDO off signal Off LEO as a result.

Operation of the electronic device 60' is now described. In operation, the secondary Ls has a time-varying current induced therein by an adjacent primary coil of a transmitter generating a time-varying electric field. The time varying current is rectified by the rectifier 16 produced the rectified voltage Vin, beginning startup. The LDO 100 generates the internal voltage Vint from the rectified voltage Vin, at higher voltage, of about 5V, as explained above.

At startup, the switching regulator 112 has not yet generated the external voltage Vext at a sufficient level for powering the internal analog and digital circuits 110. As a result, the digital core 52 maintains the external voltage enable signal Ex_En at a logic low. Since the external voltage Vext will at this point be lower than the digital reference voltage (which is set to a desired value for Vext), the digital core 52 does not assert the comparison output Comp. As a result, the AND gate 229 maintains the LDO off signal Off_LDO at a logic low.

Off_LDO being a logic low has the effect of turning on the transmission gate S1, thereby connecting the internal voltage Vint to node Nout, and the internal analog/digital circuits 110 are then powered by the internal voltage Vint.

One the external voltage Vext is generated at a sufficiently high level by the switching regular 112 to be capable of beginning to power the internal analog and digital circuits 110, the digital core 52 asserts the external voltage enable signal Ext_En. As explained earlier, this has the effect of causing the LDO 100 to lower the internal voltage Vint generated, for example from 5V to 4.2V. The external voltage enable signal Ext_En also has the effect of turning on the transmission gate S2, thereby connecting the external voltage Vext to the output node Nout. As explained earlier, since the LDO 100 cannot sink current due to its use of a p-channel transistor as its power transistor, current will not flow between the switching regulator 112 and the LDO 100.

Once the external voltage Vext continues to rise, reaching the digital reference voltage of, for example, 4.8V, the digital core 52 asserts Vcomp, which, together with the asserted external voltage enable signal Ext_En, results in the AND gate 229 asserting the Off_LDO signal, turning off the LDO 100, and closing the transmission gate S1. Therefore, at this point, the internal analog/digital circuits 100 are solely powered by the switching regulator 112, not the LDO 100.

Figure 10:
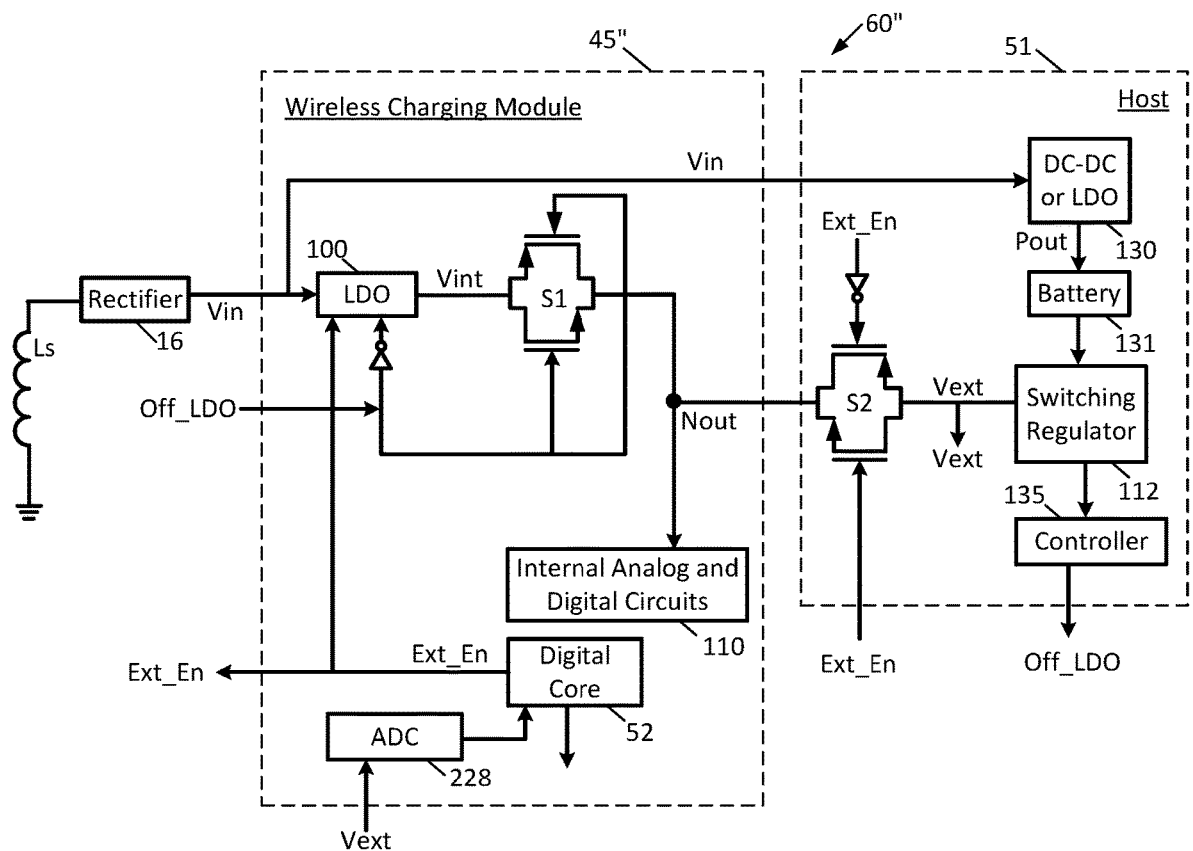
FIG. 10 is a block diagram of another variant of the wireless charging module of FIG. 6, in accordance with this disclosure.

A variant of the electronic device 60" described above is now described with reference to FIG. 10. Notice that here, an analog to digital converter (ADC) 228 within the wireless charging module 45" receives and digitizes the external voltage Vext, and from the value of Vext, a digital core 52 (also within the wireless charging module 45') generates the external voltage enable signal Ext_En, which is used within the wireless charging module 45' as well as within the host 51.

Operation of the electronic device 60" is now described. In operation, the secondary Ls has a time-varying current induced therein by an adjacent primary coil of a transmitter generating a time-varying electric field. The time varying current is rectified by the rectifier 16 produced the rectified voltage Vin, beginning startup. The LDO 100 generates the internal voltage Vint from the rectified voltage Vin, at higher voltage, of about 5V, as explained above.

At startup, the switching regulator 112 has not yet generated the external voltage Vext at a sufficient level for powering the internal analog and digital circuits 110. As a result, the digital core 52 maintains the external voltage enable signal Ex_En at a logic low. Since the external voltage Vext will at this point be lower than a digital reference voltage (which is set to a desired value for Vext), the controller 135 maintains the LDO off signal Off_LDO at a logic low.

Off_LDO being a logic low has the effect of turning on the transmission gate S1, thereby connecting the internal voltage Vint to node Nout, and the internal analog/digital circuits 110 are then powered by the internal voltage Vint.

One the external voltage Vext is generated at a sufficiently high level by the switching regular 112 to be capable of beginning to power the internal analog and digital circuits 110, the digital core 52 asserts the external voltage enable signal Ext_En. As explained earlier, this has the effect of causing the LDO 100 to lower the internal voltage Vint generated, for example from 5V to 4.2V. The external voltage enable signal Ext_En also has the effect of turning on the transmission gate S2, thereby connecting the external voltage Vext to the output node Nout. As explained earlier, since the LDO 100 cannot sink current due to its use of a p-channel transistor as its power transistor, current will not flow between the switching regulator 112 and the LDO 100.

Once the external voltage Vext continues to rise, reaching the digital reference voltage of, for example, 4.8V, the controller asserts the Off_LDO signal, turning off the LDO 100, and turning off the transmission gate S1. Therefore, at this point, the internal analog/digital circuits 100 are solely powered by the switching regulator 112, not the LDO 100.

To reiterate, in the devices 50, 60, 60', and 60" described herein, power efficiency is greatly improved because, after power-up using the LDO 100 to power the internal analog and digital circuits 110, once the switching regulator 112 is ready, the internal analog and digital circuits 110 are instead powered by the switching regulator 112. The LDO 100 dissipates a large amount of power (resulting in a corresponding rise in temperature) by converting the rectified voltage Vin of about 20V down to a voltage of about 5V for powering the internal analog and digital circuits 112, while the power dissipation (and the accompanying rise in temperature due to power dissipation) within the switching regulator 112 is much lower because it begins with an input voltage from the battery 131 that is much closer to the external voltage Vext. Thus, as stated, due to the switchover to powering the internal analog and digital circuits 110 using the switching regulator 112 after startup, efficiency is greatly improved by the devices described herein.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system, comprising:
a wireless power receiver configured to wirelessly receive power and generate therefrom a rectified voltage;
a low dropout regulator that, during a first phase, generates a first regulated output voltage from the rectified voltage;
a first switch that couples the first regulated output voltage to a voltage output node during the first phase;
wherein the low dropout regulator, during a second phase, generates a second regulated output voltage from the rectified voltage, the second regulated output voltage being lesser in magnitude than the first regulated output voltage;
a switching regulator that generates a third regulated output voltage during the second phase, the third regulated output voltage being greater than the second regulated output voltage; and
a second switch that couples the third regulated output voltage to the voltage output node during the second phase;
wherein the low dropout regulator, during a third phase, is disabled, while the switching regulator continues to generate the third regulated output voltage during the third phase; and
wherein the first switch opens during the third phase while the second switch remains closed during the third phase.

2. The system of claim 1, wherein the low dropout regulator comprises:
a p-channel power transistor having a source coupled to the rectified voltage, a drain coupled to an output node, and a gate receiving a drive signal;
a feedback resistance coupled between the output node and ground and producing a feedback voltage;
feedback resistance control circuitry configured to lower the feedback resistance during the second phase; and
drive circuitry configured to generate the drive signal for the p-channel power transistor based upon the feedback voltage.

3. The system of claim 2, wherein the feedback resistance comprises a first resistance coupled between the output node and a feedback node, and a second resistance coupled between the feedback node and ground, wherein the second resistance is variable responsive to the feedback resistance control circuitry.

4. The system of claim 2, wherein the feedback resistance comprises a first resistance coupled between the output node and a feedback node, a second resistance coupled between the feedback node and a first node, and a third resistance coupled between the first node and ground.

5. The system of claim 4, wherein the feedback resistance control circuitry is configured to short the third resistance during the second phase to thereby lower the feedback resistance.

6. The system of claim 5, wherein the feedback resistance control circuitry comprises an n-channel transistor having a drain coupled to the first node, a source coupled to ground, and a gate coupled to an external regulator enable signal.

7. The system of claim 2, wherein the drive circuitry is disabled during the third phase to thereby disable the low dropout regulator in response to assertion of a low dropout disable signal.

8. The system of claim 7, wherein the drive circuitry comprises:
a voltage generator producing a first voltage as a function of the feedback voltage;
a compensation network producing a compensated voltage from the first voltage; and
a driver stage producing the drive signal from the compensated voltage;
wherein the voltage generator, compensation network, and driver stage are disabled in response to assertion of the low dropout disable signal.

9. The system of claim 8, wherein the voltage generator is a Brokaw cell.

10. The system of claim 8, further comprising a power source receiving the rectified voltage and generating therefrom a power signal, and a load powered by the power signal.

11. The system of claim 10, wherein the load comprises a battery charging circuit for charging a battery.

12. The system of claim 1, further comprising internal circuitry powered between the voltage output node and ground; and wherein disabling the low dropout regulator and continuing to power the voltage output node using the switching regulator during the third phase eliminates power dissipation by the low dropout regulator that would otherwise occur during the third phase if the low dropout regulator had not been disabled and therefore also eliminates rise in temperature that would otherwise occur during the third phase if the low dropout regulator had not been disabled.

13. A method, comprising:
receiving power wirelessly;
rectifying the received power to produce a rectified voltage;
in a startup condition:
enabling a low dropout regulator circuit, the low dropout regulator circuit generating an output voltage from the rectified voltage; and
powering internal analog and digital circuitry using the output voltage by coupling the output voltage to the internal analog and digital circuitry; and
when startup is complete:
reducing the output voltage generated by the low dropout regulator circuit;
enabling a switching regulator;
coupling an output voltage of the enabled the switching regulator to the internal analog and digital circuitry; and
then disabling the low dropout regulator circuit.

14. The method of claim 13, wherein the output voltage generated by the low dropout regulator circuit is reduced by reducing resistance of a feedback circuit in the low dropout regulator circuit.

15. The method of claim 14, wherein the resistance of the feedback circuit is reduced by shorting one of a plurality of series connected resistances in the feedback circuit.

16. The method of claim 13, further comprising generating a power output signal from the rectified voltage, and powering a load using the power output signal.

17. An electronic device, comprising:
internal analog and digital circuitry;
a battery;
a battery charging circuit;
a receiver coil receiving wirelessly transmitted power and generating an AC input voltage therefrom;
a rectifier rectifying the AC input voltage to produce a rectified voltage;
a low dropout regulator that, during a first phase, generates a first regulated output voltage from the rectified voltage;
a first switch that couples the first regulated output voltage to a voltage output node during the first phase to power the internal analog and digital circuitry;
wherein the low dropout regulator, during a second phase, generates a second regulated output voltage from the rectified voltage, the second regulated output voltage being lesser in magnitude than the first regulated output voltage;
wherein the first switch couples the second regulated output voltage to the voltage output node during the second phase;
a switching regulator that generates a third regulated output voltage during the second phase, the third regulated output voltage being greater than the second regulated output voltage; and
a second switch that couples the third regulated output voltage to the voltage output node during the second phase;
wherein the low dropout regulator, during a third phase, is disabled, while the switching regulator continues to generate the third regulated output voltage during the third phase;
wherein the first switch opens during the third phase while the second switch remains closed during the third phase; and
a power supply circuit receiving the rectified voltage and generating therefrom a power supply signal for powering the battery charging circuit, during the first, second, and third phases.

18. The electronic device of claim 17, wherein the low dropout regulator comprises:
a p-channel power transistor having a source coupled to the rectified voltage, a drain coupled to an output node, and a gate receiving a drive signal;
a feedback resistance coupled between the output node and ground and producing a feedback voltage;
feedback resistance control circuitry configured to lower the feedback resistance during the second phase; and
drive circuitry configured to generate the drive signal for the p-channel power transistor based upon the feedback voltage.

19. The electronic device of claim 18, wherein the feedback resistance comprises a first resistance coupled between the output node and a feedback node, a second resistance coupled between the feedback node and a first node, and a third resistance coupled between the first node and ground.

20. The electronic device of claim 19, wherein the feedback resistance control circuitry is configured to short the third resistance during the second phase to thereby lower the feedback resistance.

21. The electronic device of claim 20, wherein the feedback resistance control circuitry comprises an n-channel transistor having a drain coupled to the first node, a source coupled to ground, and a gate coupled to an external regulator enable signal.

22. A wireless charging module, comprising:
a wireless power receiver configured to wirelessly receive power and generate therefrom a rectified voltage;
a low dropout regulator that, in response to lack of assertion of a low dropout amplifier disable signal, generates a first regulated output voltage from the rectified voltage; and
a first switch that couples the first regulated output voltage to a voltage output node to thereby power at least one internal circuit, in response to lack of assertion of the low dropout amplifier disable signal;

wherein the voltage output node, in response to an external voltage enable signal being asserted, receives an external voltage, and the low dropout regulator generates a second regulated output voltage from the rectified voltage so as to transition the at least one internal circuit to being powered by the external voltage, the second regulated output voltage being lesser in magnitude than the first regulated output voltage;

wherein the low dropout amplifier, in response to assertion of the low dropout amplifier disable signal, is disabled; and wherein the first switch opens in response to assertion of the low dropout amplifier disable signal.

23. The wireless charging module of claim 22, wherein the low dropout amplifier disable signal is generated as being deasserted by a host external to the wireless charging module at startup;

wherein an external voltage enable signal is generated as being asserted by the host in response to the external voltage reaching a first external voltage level; and wherein the low dropout amplifier disable signal is generated as being asserted by the host in response to the external voltage reaching a second external voltage level greater than the first external voltage level.

24. The wireless charging module of claim 22, wherein the low dropout amplifier disable signal is generated as being deasserted by a digital core internal to the wireless charging module at startup;

wherein the external voltage enable signal is generated as being asserted by a host external to the wireless charging module in response to the external voltage reaching a first external voltage level; and wherein the low dropout amplifier disable signal is generated as being asserted by the digital core in response to the external voltage reaching a second external voltage level greater than the first external voltage level.

25. The wireless charging module of claim 22, further comprising a monitoring circuit that generates the low dropout amplifier disable signal is generated as being deasserted at startup;

wherein an external voltage enable signal is generated as being asserted by a host external to the wireless charging module in response to the external voltage reaching a first external voltage; and wherein the monitoring circuit generates the low dropout amplifier disable signal as being asserted in response to the external voltage reaching a second external voltage greater than the first external voltage.

26. The wireless charging module of claim 25, wherein the monitoring circuit comprises:

a comparator configured to assert its output in response to the external voltage being equal to or greater than a reference voltage; and a logical AND gate configured to assert the low dropout amplifier disable signal in response to the output of the comparator being asserted and in response to the external voltage enable signal being asserted, and to otherwise deassert the low dropout amplifier disable signal.

27. The wireless charging module of claim 22, further comprising a monitoring circuit that generates the low dropout amplifier disable signal as being deasserted at startup;

further comprising a digital core that generates the external voltage enable signal as being deasserted at startup;

wherein the digital core asserts the external voltage enable signal in response to the external voltage reaching a first external voltage level;

wherein the digital core asserts a comparison signal in response to the external voltage reaching a second external voltage level greater than the first external voltage level; and wherein the monitoring circuit asserts the low dropout amplifier disable signal in response to the external voltage enable signal and the comparison signal being asserted.

28. The wireless charging module of claim 27, wherein the monitoring circuit comprises an AND gate that asserts the low dropout amplifier disable signal in response to the external voltage enable signal and the comparison signal being asserted, and otherwise deasserts the low dropout amplifier disable signal.

29. The wireless charging module of claim 22, wherein the low dropout amplifier disable signal is generated as being deasserted by a host external to the wireless charging module at startup;

further comprising a digital core that generates the external voltage enable signal as being deasserted at startup;

wherein the digital core asserts the external voltage enable signal in response to the external voltage reaching a first external voltage level; and wherein the low dropout amplifier disable signal is asserted by the host external in response to the external voltage reaching a second external voltage level greater than the first external voltage level.

* * * * *